United States Patent
Zhan

(10) Patent No.: US 8,488,337 B2
(45) Date of Patent: Jul. 16, 2013

(54) OFFLINE AC-DC CONTROLLER CIRCUIT AND A CONVERTER COMPRISING THE SAME

(71) Applicant: Hangzhou Silan Microelectronics Co., Ltd., Hangzhou (CN)

(72) Inventor: Hua Zhan, Hangzhou (CN)

(73) Assignee: Hangzhou Silan Microelectronics Co., Ltd., Hangzhou (CN)

( * ) Notice: Subject to any disclaimer, the term of this patent is extended or adjusted under 35 U.S.C. 154(b) by 0 days.

(21) Appl. No.: 13/651,010

(22) Filed: Oct. 12, 2012

(65) Prior Publication Data
US 2013/0039098 A1 Feb. 14, 2013

Related U.S. Application Data

(63) Continuation of application No. PCT/CN2012/070752, filed on Jan. 30, 2012.

(30) Foreign Application Priority Data

Mar. 25, 2011 (CN) .......................... 2011 1 0084811

(51) Int. Cl.
*H02M 3/335* (2006.01)
(52) U.S. Cl.
USPC ................. 363/21.01; 363/21.12; 363/56.05; 363/97; 363/131
(58) Field of Classification Search
USPC ................ 363/16, 20, 21.01, 21.1, 21.11, 95, 363/97, 131, 21.12, 56.01, 56.05
See application file for complete search history.

(56) References Cited

U.S. PATENT DOCUMENTS

| 6,191,957 | B1 * | 2/2001 | Peterson | 363/17 |
|---|---|---|---|---|
| 6,850,426 | B2 * | 2/2005 | Kojori et al. | 363/123 |
| 6,856,519 | B2 * | 2/2005 | Lin et al. | 363/16 |
| 7,054,170 | B2 * | 5/2006 | Yang et al. | 363/21.18 |
| 7,471,527 | B2 * | 12/2008 | Chen | 363/65 |
| 2003/0206426 | A1 | 11/2003 | Lin et al. | |
| 2009/0257251 | A1 * | 10/2009 | Su et al. | 363/21.15 |
| 2010/0195355 | A1 * | 8/2010 | Zheng | 363/21.12 |
| 2010/0270942 | A1 | 10/2010 | Hui et al. | |
| 2010/0308733 | A1 * | 12/2010 | Shao | 315/119 |

FOREIGN PATENT DOCUMENTS

| CN | 1457135 A | 11/2003 |
|---|---|---|
| CN | 201414244 A | 2/2010 |
| CN | 101662218 A | 3/2010 |

* cited by examiner

*Primary Examiner* — Adolf Berhane
(74) *Attorney, Agent, or Firm* — Birch, Stewart, Kolasch & Birch, LLP

(57) ABSTRACT

An offline AC-DC converter circuits including an overvoltage detection module, a current limiting module, a PWM module and a switch control module coupled to the above modules. The overvoltage detection module, the current limiting module and the PWM module share a common input terminal. The sampled current signal and the sampled voltage signal are provided at the common input terminal by way of time-division multiplexing. With the time-multiplexed terminal, overvoltage detection for the output voltage is performed during the period when the power transistor is cut off and a current through the power transistor is detected during the period when the power transistor conducts. The two signals are input by way of time-division multiplexing, which are not affected by each other. Accordingly, overvoltage in the output voltage can be precisely detected without additional terminals, and thus the overvoltage can be controlled.

15 Claims, 9 Drawing Sheets

OFFLINE AC-DC CONTROLLER CIRCUIT AND A CONVERTER COMPRISING THE SAME

FIELD OF THE INVENTION

The present invention relates to an off-line AC-DC converter circuit, and more specifically, to a technology for detecting overvoltage in an output of a SSR (Secondary Side Regulation) flyback converter circuit.

BACKGROUND

Currently, SSR flyback converter is the most commonly used circuit in terms of off-line AC-DC converter circuit with intermediate output power.

FIG. 1 illustrates a system schematic of a typical SSR offline flyback AC-DC converter circuit. As shown in FIG. 1, the converter circuit includes an off-line AC-DC controller circuit 1 and a peripheral circuit. The offline AC-DC controller circuit 1 includes an overvoltage detection module 10, a current limiting module 11, a PWM comparator 12, and a switch control module 13.

Referring to FIG. 1, the overvoltage detection module 10 includes a comparator A1. The positive input terminal of the comparator A1 is coupled to a power source terminal VDD. The negative input terminal of the comparator A1 is coupled to an internal reference voltage VREF1. The current limiting module 11 includes a comparator A2. The positive input terminal of the comparator A2 is coupled to a current sampling terminal CS. The negative input terminal of the comparator A1 is coupled to an internal reference voltage VREF2. The PWM comparator, or PWM module 12, includes a comparator A3. The positive input terminal of the comparator A3 is coupled to the current sampling terminal CS. The negative input terminal of the comparator A1 is coupled to a feedback terminal FB. The input of the switch control module 13 is coupled to an output terminal of the comparators A1 to A3. The output of the switch control module 13 is coupled to a gate driven terminal GATE. The gate driven terminal VDD of the controller circuit 1 is coupled to a negative terminal of the external freewheeling diode D6 and an anode plate of the capacitor C3. The current sampling terminal CS of the controller circuit 1 is coupled to the source of the external power transistor M1 and a terminal of the sampling resistor R1. The gate driven terminal GATE of the controller circuit 1 is coupled to the gate of the external power transistor M1.

In the foregoing SSR offline flyback AC-DC converter system, the overvoltage detection for the output voltage Vo is performed by detecting whether the VDD voltage is overvoltage. However, for the same output voltage, when the load varies, there will be a considerable variation in VDD voltage. Thus, the threshold for overvoltage detection may vary significantly as the load varies if the overvoltage detection for the output voltage Vo is performed by detecting VDD voltage.

Accordingly, an SSR offline flyback AC-DC converter circuit as illustrated in FIG. 2 may be adopted. In the converter circuit shown in FIG. 2, an anti-phase terminal of an auxiliary winding N3, after the division by resistors R2/R3, is then coupled to an overvoltage detection terminal OVP of the controller circuit 1, acting as a sample point for overvoltage detection. The relation between the anti-phase voltage V3 of the auxiliary winding N3 and the anti-phase voltage V2 of the secondary winding N2 states as follows:

$$\frac{V3}{V2} = \frac{n3}{n2} \quad (1)$$

where n3 is the number of turns of the auxiliary winding N3 and n2 is the number of turns of the secondary winding N2.

In addition, when the power transistor M1 is in cut-off state and the current through the secondary and the auxiliary windings continues to flow, the relation between the voltage V3 and the output voltage Vo is expressed as follows:

$$V3 = \frac{n3}{n2}(Vo - V_{FD5}) \quad (2)$$

where $V_{FD5}$ denotes a forward voltage drop across the diode D5.

At this point, the voltage at the OVP terminal is as follows:

$$\frac{R3}{R2+R3} \cdot \frac{n3}{n2}(Vo + V_{FD5}) \quad (3)$$

where R2 and R3 denote resistance of the resistor R2 and the resistor R3.

As can be seen from equation (3), the voltage at the OVP terminal is in linear relation with Vo, which may precisely reflect whether there is overvoltage in the voltage Vo. Thus, the defects that the threshold for overvoltage detection varies with the load, as illustrated in the system shown in FIG. 1, may be overcome by detecting this voltage. However, the shortcoming of the converter circuit shown in FIG. 2 lie in that the controller circuit 1 requires an additional OVP terminal for voltage input.

SUMMARY

The present invention is aimed at overcoming the foregoing defects and providing an offline AC-DC controller circuit. By way of time-multiplexing a common terminal, the offline AC-DC converter circuit allows precise overvoltage detection for the output voltage without additional terminal added to the controller circuit.

The present invention can be implemented by the below technical solutions.

An offline AC-DC controller circuit is provided. The offline AC-DC controller circuit generates a corresponding control signal based on an input sampled current signal and an input sampled voltage signal. The sampled current signal and the sampled voltage signal are provided at a single input terminal by way of time division multiplexing.

Preferably, in the above-described AC-DC controller circuit, the offline AC-DC controller circuit comprises an overvoltage detection module, a current limiting module, a pulse width modulation module, a switch control module coupled to the above modules. The overvoltage detection module receives the sampled voltage signal through the single input terminal. The current limiting module and the pulse width modulation module receive the sampled current signal through the single input terminal. The offline AC-DC controller circuit further includes a timing selection module. The timing selection module includes an input terminal coupled to the single input terminal and at least two output terminals. The timing selection module alternatively enables one of the output terminals to connect to the current limiting module and the pulse width modulation module and the other output terminal to connect to the overvoltage detection module such that the timing selection module alternatively provides the sampled current signal and the sampled voltage signal.

Preferably, in the above-described AC-DC controller circuit, the overvoltage detection module is configured to compare the sampled voltage signal to a predetermined first reference voltage and send the comparison result to the switch control module, wherein if the sampled voltage signal exceeds the first reference voltage, the switch control module outputs a cut-off signal for cutting off a power transistor. The current limiting module is configured to compare the sampled current signal to a predetermined second reference voltage and send the comparison result to the switch control module, wherein if the sampled current signal exceeds the second reference voltage, the switch control module outputs a cut-off signal for cutting off the power transistor. The pulse width modulation module is configured to compare the sampled current signal to a signal which is input externally to the offline AC-DC controller circuit and send the comparison result to the switch control module, wherein if the sampled current signal exceeds the externally input signal, the switch control module outputs a cut-off signal for cutting off the power transistor.

Preferably, in the above-described AC-DC controller circuit, the offline AC-DC controller circuit comprises an overvoltage detection module, a current limiting module, a pulse width modulation module, a switch control module coupled to the above modules. The overvoltage detection module receives the sampled voltage signal through the single input terminal. The current limiting module and the pulse width modulation module receive the sampled current signal through the single input terminal. The overvoltage detection module, the current limiting module and the pulse width modulation comprise conduct control circuits coupled to the switch control module. The conduct control circuits alternatively enable an output signal of the overvoltage detection module and an output signal of the current limiting module and the pulse width modulation module to be provided to the switch control module.

Preferably, in the above-described AC-DC controller circuit, the output signal of the overvoltage detection module is provided to the switch control module by applying a first enabling signal to an enable input terminal of the conduct control circuit in the overvoltage detection module, and the output signal of the current limiting module and the pulse width modulation module is provided to the switch control module by applying a second enabling signal to an enable input terminal of the conduct control circuits in the current limiting module and the pulse width modulation module, wherein the first enabling signal and the second enabling signal are mutually exclusive.

Preferably, in the above-described AC-DC controller circuit, the overvoltage detection module is configured to compare the sampled voltage signal to a predetermined first reference voltage and send the comparison result to the switch control module when the first enabling signal is applied to the enable input terminal of the conduct control circuit, wherein if the sampled voltage signal exceeds the first reference voltage, the switch control module outputs a cut-off signal for cutting off a power transistor. The current limiting module is configured to compare the sampled current signal to a predetermined second reference voltage and send the comparison result to the switch control module when the second enabling signal is applied to the enable input terminal of the conduct control circuit, wherein if the sampled current signal exceeds the second reference voltage, the switch control module outputs a cut-off signal for cutting off the power transistor. The pulse width modulation module is configured to compare the sampled current signal to a signal which is input externally to the offline AC-DC controller circuit and send the comparison result to the switch control module when the second enabling signal is applied to the enable input terminal of the conduct control circuit, wherein if the sampled current signal exceeds the externally input signal, the switch control module outputs a cut-off signal for cutting off the power transistor.

In order to overcome the above-mentioned defects, the present invention further provides an offline AC-DC converter circuit. By way of time-multiplexing a common terminal, the offline AC-DC converter circuit allows precise overvoltage detection for the output voltage without additional terminal added to the controller circuit.

The present invention can be implemented by the below technical solutions.

An offline AC-DC converter circuit is provided. The converter circuit includes the followings.

a rectifier bridge stack;
a primary winding coupled to the rectifier bridge stack;
a power transistor coupled to the primary winding;
a secondary winding;
an auxiliary winding;
an external sampling module, comprising two input terminals which are coupled to the primary winding and the auxiliary winding respectively;
an offline AC-DC controller circuit, the offline AC-DC controller circuit is configured to generate a corresponding control signal based on an input sampled current signal and an input sampled voltage signal, wherein the sampled current signal and the sampled voltage signal are provided by the external sampling module at a single input terminal by way of time division multiplexing.

Preferably, in the above offline AC-DC converter circuit, during the period when the power transistor conducts, the sampled current signal is provided at the single input terminal, while during the period when the power transistor is cut off and the current through the secondary winding and the auxiliary winding continue to flow, the sampled voltage signal is provided at the single input terminal.

Preferable, in the above offline AC-DC converter circuit, the external sampling module is configured to obtain the sampled current signal by detecting, when the power transistor conducts, a voltage drop across a sampling resistor coupled in series with the primary winding whose current flows through the sampling resistor. The external sampling module is configured to obtain the sampled voltage signal by detecting, when the power transistor is cut off, a voltage at an anti-phase terminal of the auxiliary winding.

Preferably, in the above offline AC-DC converter circuit, the offline AC-DC controller circuit comprises an overvoltage detection module, a current limiting module, a pulse width modulation module, a switch control module coupled to the above modules. The overvoltage detection module receives the sampled voltage signal through the single input terminal. The current limiting module and the pulse width modulation module receive the sampled current signal through the single input terminal. The gate voltage of the power transistor is controlled by the switch control module. The offline AC-DC controller circuit further includes a timing selection module. The timing selection module includes an input terminal coupled to the single input terminal and at least two output terminals. The timing selection module alternatively enables one of the output terminals to connect to the current limiting module and the pulse width modulation module and the other output terminal to connect to the overvoltage detection module such that the timing selection module alternatively provides the sampled current signal and the sampled voltage signal.

Preferably, in the above offline AC-DC converter circuit, the timing selection module further comprises a control signal input terminal for providing a first control signal to output the sampled voltage signal and the sampled current signal alternatively, wherein the frequency of the first control signal is in phase with that of the gate signal of the power transistor.

Preferably, in the above-described AC-DC converter circuit, the overvoltage detection module is configured to compare the sampled voltage signal to a predetermined first reference voltage and send the comparison result to the switch control module, wherein if the sampled voltage signal exceeds the first reference voltage, the switch control module outputs a cut-off signal for cutting off a power transistor. The current limiting module is configured to compare the sampled current signal to a predetermined second reference voltage and send the comparison result to the switch control module, wherein if the sampled current signal exceeds the second reference voltage, the switch control module outputs a cut-off signal for cutting off the power transistor. The pulse width modulation module is configured to compare the sampled current signal to a signal which is input externally to the offline AC-DC controller circuit and send the comparison result to the switch control module, wherein if the sampled current signal exceeds the externally input signal, the switch control module outputs a cut-off signal for cutting off the power transistor.

Preferably, in the above-described AC-DC converter circuit, the offline AC-DC controller circuit comprises an overvoltage detection module, a current limiting module, a pulse width modulation module, a switch control module coupled to the above modules. The overvoltage detection module receives the sampled voltage signal through the single input terminal. The current limiting module and the pulse width modulation module receive the sampled current signal through the single input terminal. The gate voltage of the power transistor is controlled by the switch control module. The overvoltage detection module, the current limiting module and the pulse width modulation comprise conduct control circuits coupled to the switch control module. The conduct control circuits alternatively enable an output signal of the overvoltage detection module and an output signal of the current limiting module and the pulse width modulation module to be provided to the switch control module.

Preferably, in the above-described AC-DC converter circuit, the output signal of the overvoltage detection module is provided to the switch control module by applying a first enabling signal to an enable input terminal of the conduct control circuit in the overvoltage detection module, and the output signal of the current limiting module and the pulse width modulation module is provided to the switch control module by applying a second enabling signal to an enable input terminal of the conduct control circuits in the current limiting module and the pulse width modulation module, wherein the first enabling signal and the second enabling signal are mutually exclusive.

Preferably, in the above-described AC-DC converter circuit, the overvoltage detection module is configured to compare the sampled voltage signal to a predetermined first reference voltage and send the comparison result to the switch control module when the first enabling signal is applied to the enable input terminal of the conduct control circuit, wherein if the sampled voltage signal exceeds the first reference voltage, the switch control module outputs a cut-off signal for cutting off a power transistor. The current limiting module is configured to compare the sampled current signal to a predetermined second reference voltage and send the comparison result to the switch control module when the second enabling signal is applied to the enable input terminal of the conduct control circuit, wherein if the sampled current signal exceeds the second reference voltage, the switch control module outputs a cut-off signal for cutting off the power transistor. The pulse width modulation module is configured to compare the sampled current signal to a signal which is input externally to the offline AC-DC controller circuit and send the comparison result to the switch control module when the second enabling signal is applied to the enable input terminal of the conduct control circuit, wherein if the sampled current signal exceeds the externally input signal, the switch control module outputs a cut-off signal for cutting off the power transistor.

Compared with the conventional art, the present invention enjoy the below advantages.

By time-multiplexing an terminal, overvoltage detection for the output voltage is performed during the period when the power transistor is cut off and a current through the power transistor is detected during the period when the power transistor conducts. The two signals are input by way of time-division multiplexing, which are not affected by each other. Accordingly, overvoltage in the output voltage can be precisely detected without additional terminals, and thus the overvoltage can be controlled.

The above and other advantages concerning the present invention will become more readily appreciated by reference to the following description of the embodiments, when taken in conjunction with the accompanying drawings.

DETAILED DESCRIPTION

Specific embodiments according to the present invention are made below in conjunction with the annexed drawing. It is to be noted that these specific embodiments are merely intended to be illustrative, rather than limiting to the spirit and scope of the present invention.

In the specification of the present invention, the word "couple" should be interpreted as including a situation where energy or a signal is delivered directly between two components or a situation where energy or a signal is delivered indirectly by virtue of one or more third components. Moreover, the signal herein includes, but is not limited to, a signal in electrical, optical and magnetic forms. In addition, the words such as "include" and "comprise" indicates that in addition to units and steps that are directly or explicitly described in the specification and claims, the technical scheme of the present invention does not preclude other units and steps that are not directly or explicitly described. In addition, the words such as "first" and "second" do not refer to the sequence in time, space, size of the unit or value, but rather are used for distinguishing each unit or value.

Illustrations are made to the present disclosure in connection with the accompanying drawings.

Figure 3:
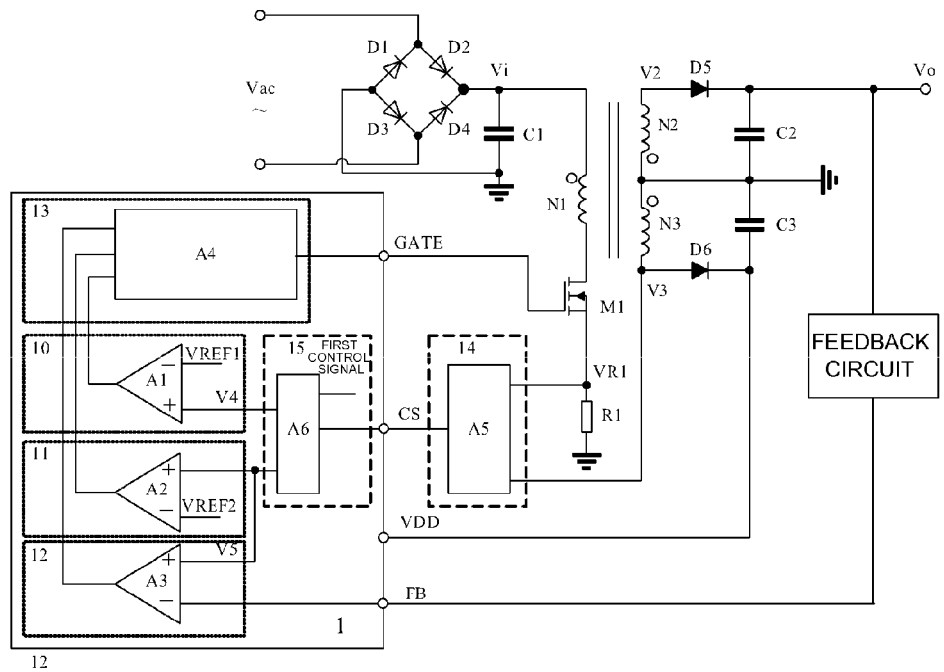
FIG. 3 illustrates a schematic of an offline AC-DC converter circuit according to one embodiment of the present invention.

FIG. 3 illustrates a schematic of an offline AC-DC converter circuit according to one embodiment of the present invention.

As illustrated in FIG. 3, the offline AC-DC converter circuit includes a rectifier bridge stack (comprised of a diode D1, a diode D2, a diode D3, a diode D4) along with a filtering capacitor C1, a primary winding N1, a power transistor M1 along with a sampling resistor R1, a secondary winding N2 along with a filter circuit (comprised of a freewheeling diode D5 and a filtering capacitor C2), an auxiliary winding N3 along with a filter circuit (comprised of a freewheeling diode D6 and a filtering capacitor C3), an output voltage feedback circuit and an offline AC-DC controller circuit 1.

Referring to FIG. 3, the offline AC-DC controller circuit 1 includes a time-multiplexed terminal CS. During the period when the power transistor M1 of the offline AC-DC converter circuit conducts, the time-multiplexed terminal CS is configured to input a sampled signal of the primary winding current. During the period when the power transistor M1 is cut off, the time-multiplexed terminal CS is configured to input a sampled output voltage signal. Thus, the time-multiplexed terminal samples the primary winding current and the output voltage of the AC-DC converter circuit in a time multiplexed way.

In the present embodiment, the time-multiplexed terminal CS is coupled to an output terminal of an external sampling module 14 of the offline AC-DC converter circuit. A first input terminal of the external sampling module 14 inputs a sampled current signal of the primary winding N1 of the offline AC-DC converter circuit. A second input terminal of the external sampling module 14 inputs a sampled output voltage signal of the offline AC-DC converter circuit. Specifically, when the external power transistor M1 conducts, the current through the primary winding N1 flows through the sampling resistor R1 coupled in series with the primary winding. The sampled current signal of the primary winding N1 may be obtained by detecting the voltage drop across the resistor R1. When the external power transistor M1 is cut off, the sampled output voltage signal can be obtained by detecting the anti-phase voltage V3 of the auxiliary winding N3 of the offline AC-DC converter circuit.

Figure 1:
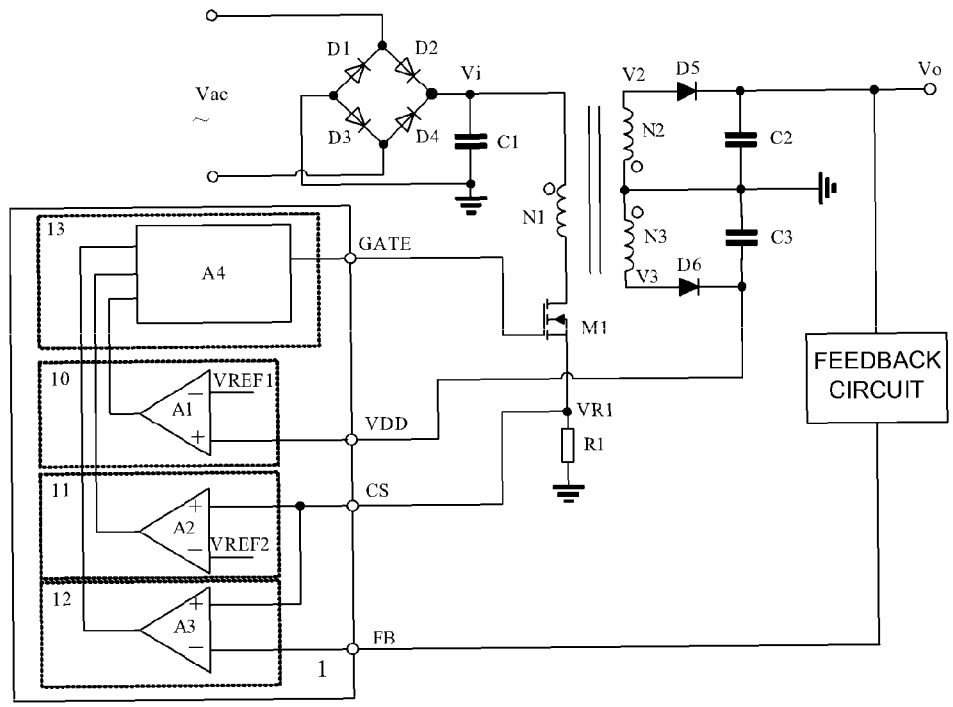
FIG. 1 illustrates a schematic of a typical offline AC-DC converter circuit.
Figure 2:
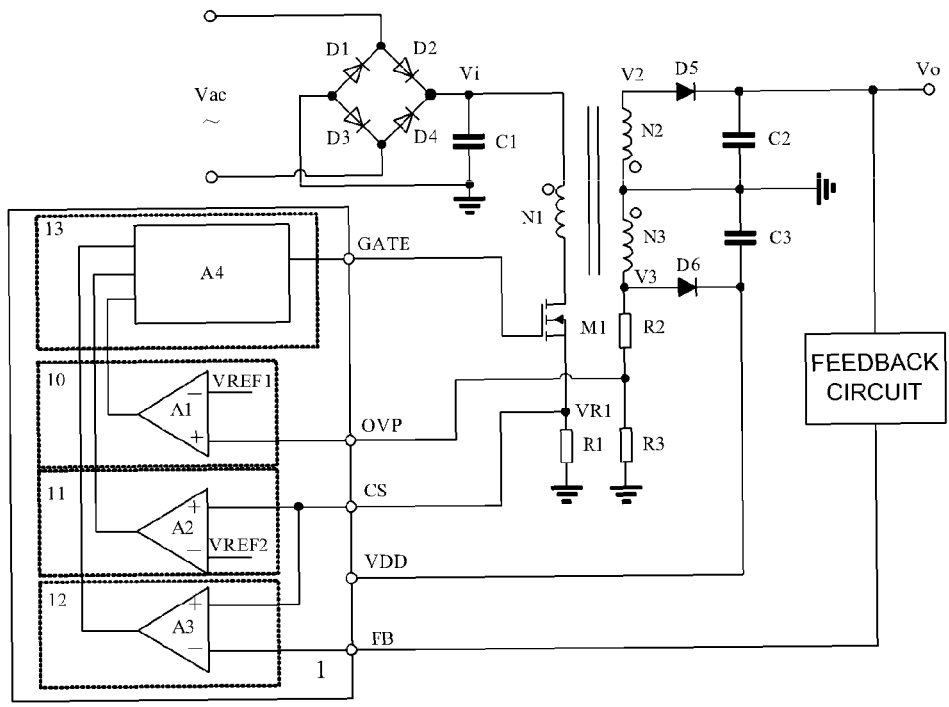
FIG. 2 illustrates a schematic of an another typical offline AC-DC converter circuit.

Compared with FIG. 1 and FIG. 2, the offline AC-DC controller circuit 1 according to the present embodiment also includes an overvoltage detection module 10, a current limiting module 11, a PWM comparator 12 and a switch control module 13. However, the difference lies in that the offline AC-DC controller circuit 1 further includes a timing selection module 15 which includes an input terminal coupled to the time-multiplexed terminal CS and at least two output terminals. Under the control of the first control signal, the timing selection module 15 reverts the signal input to the time-multiplexed terminal CS into a first signal and a second signal, wherein the first signal is the sampled output voltage signal which is fed to the voltage detection module 10, and the second signal is the sampled current signal of the primary winding which is fed to the current limiting module 11 and the PWM comparator 12. The frequency of the first control signal herein is in phase with a gate signal of the power transistor M1.

Figure 4:
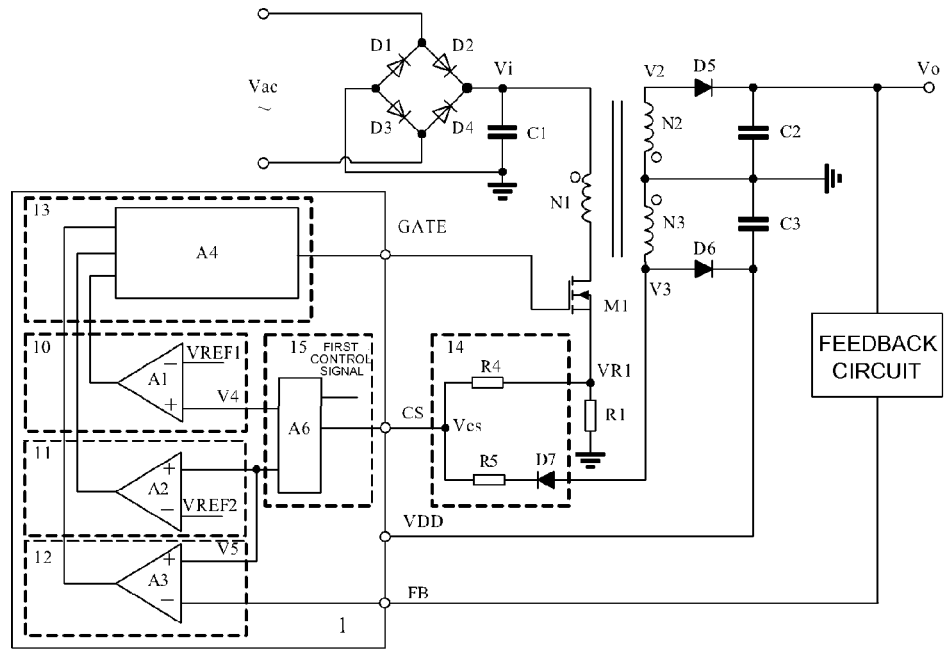
FIG. 4 illustrates a schematic of an offline AC-DC converter circuit according to another embodiment of the present invention.

FIG. 4 illustrates a schematic of an offline AC-DC converter circuit according to another embodiment of the present invention.

Compared with the offline AC-DC converter circuit shown in FIG. 3, the external sampling module 14 includes a first input terminal coupled to the source of the external power transistor M1 and a terminal of the resistor R1, a second input terminal coupled to the anti-phase terminal of the auxiliary winding N3, an output terminal coupled to the time-multiplexed terminal CS of the offline AC-DC converter circuit 1, a diode D7 and a plurality of resistors. The positive terminal of the diode D7 is coupled to the anti-phase terminal of the auxiliary winding N3. The negative terminal of the diode D7 is coupled to a terminal of the resistor R5. The plurality of resistors includes the resistor R5 and a resistor R4. A terminal of the resistor R5 is coupled to the negative terminal of the diode D7. The other terminal of the resistor R5 is coupled to the time-multiplexed terminal CS and a terminal of the resistor R4. The other terminal of the resistor R4 is coupled to a terminal of the resistor R1 and the source of the power transistor M1.

Figure 7:
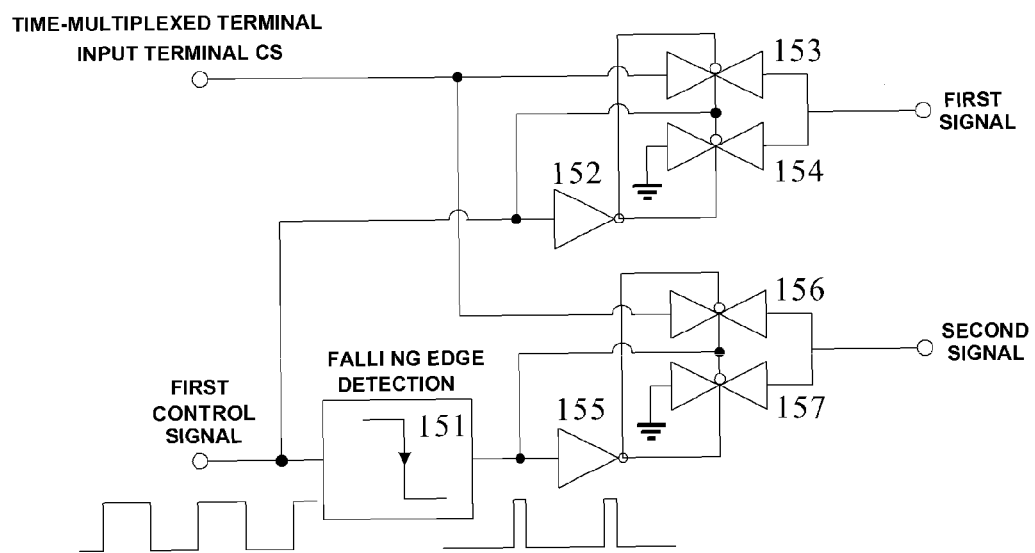
FIG. 7 illustrates an implementation of timing selection circuits shown in FIG. 3 and FIG. 4.

FIG. 7 illustrates an implementation of timing selection circuits shown in FIG. 3 and FIG. 4.

In the timing selection module 15 as shown in FIG. 7, when the first control signal is at a high level, the timing selection module 15 controls a transfer gate 153 to conduct and allows the signal output from the time-multiplexed terminal CS to be the first signal. When the first control signal is at a low level, the timing selection module 15 controls a transfer gate 154 to conduct and the first signal is at a zero voltage. In another aspect, when the first control signal is fed to a falling edge detection module 151, the falling edge detection module 151 outputs a high voltage narrow pulse signal at the falling edge of the first control signal. When the high voltage narrow pulse signal is at a high voltage level, the timing selection module 15 controls a transfer gate 156 to conduct and allows the signal output from the multiplexed terminal CS to be the second signal. When the high voltage narrow pulse signal is at a low voltage level, the timing selection module 15 controls a transfer gate 157 to conduct and the second signal is at a zero voltage.

Figure 8:
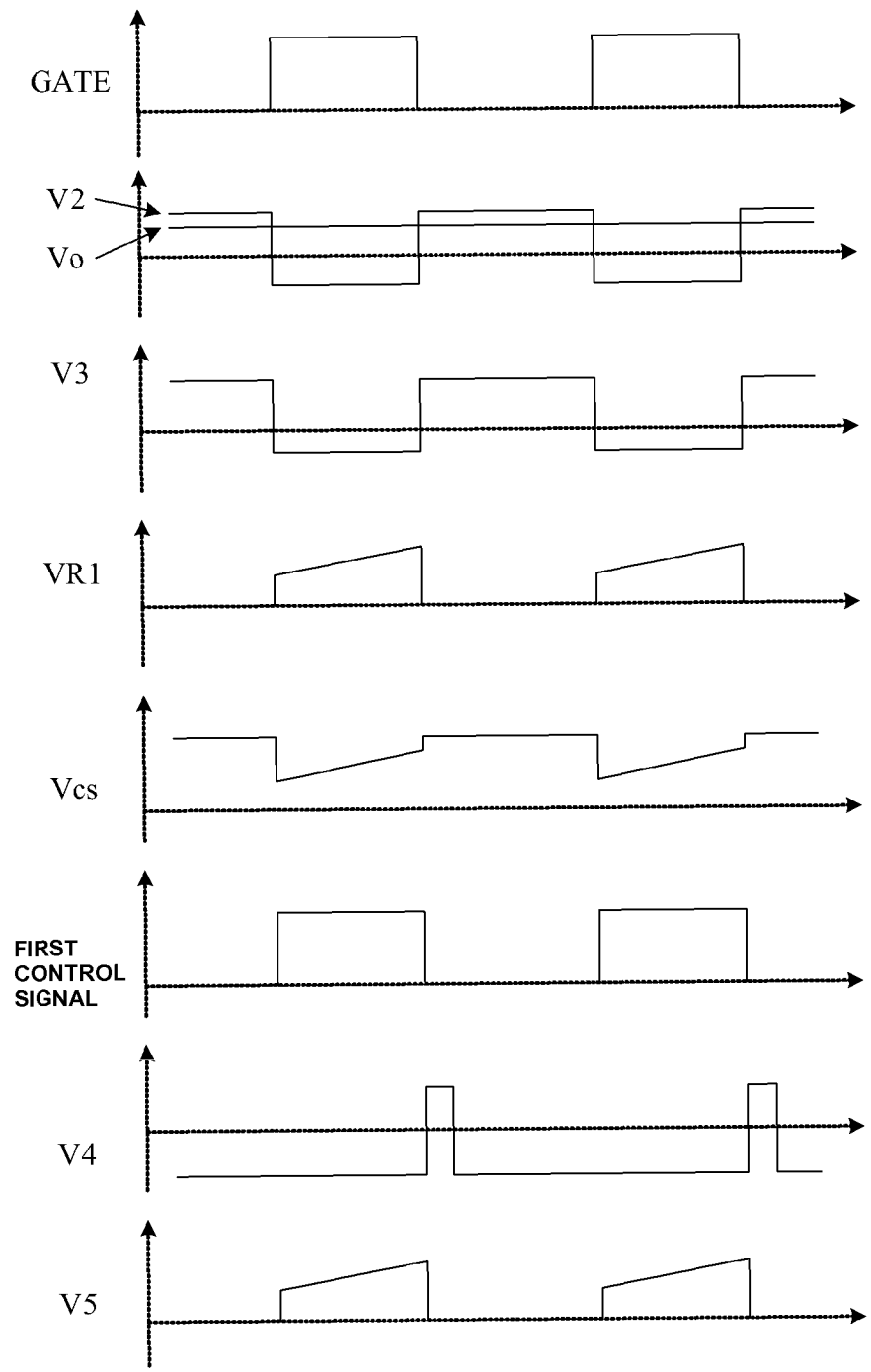
FIG. 8 illustrates waveforms of associated signals in the offline AC-DC converter circuit shown in FIG. 3 and FIG. 4 in a continuous conduct mode.
Figure 9:
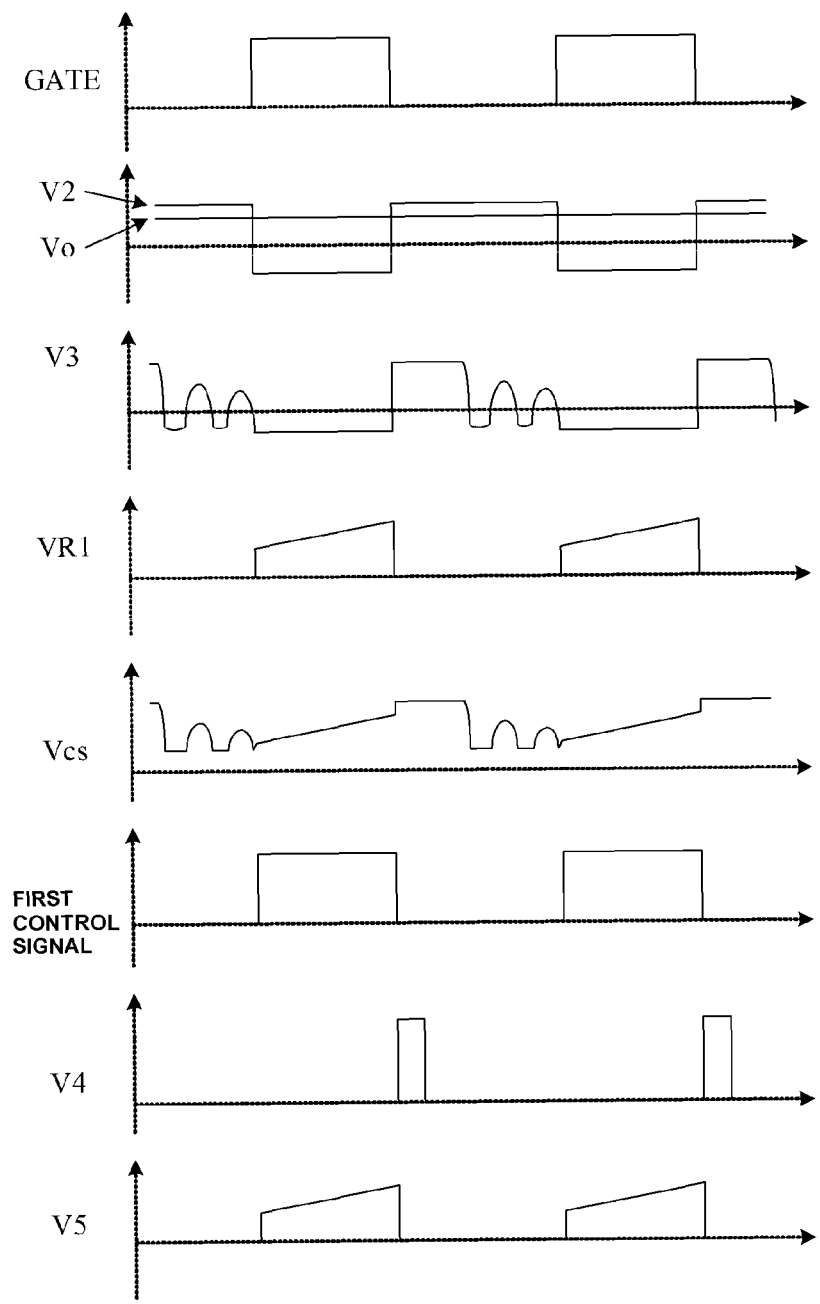
FIG. 9 illustrates waveforms of associated signals in the offline AC-DC converter circuit shown in FIG. 3 and FIG. 4 in an discontinuous conduct mode.

FIG. 8 illustrates waveforms of associated signals in the offline AC-DC converter circuit shown in FIG. 3 and FIG. 4 in a continuous conduct mode. FIG. 9 illustrates waveforms of associated signals in the offline AC-DC converter circuit shown in FIG. 3 and FIG. 4 in an discontinuous conduct mode.

As shown in FIG. 8 and FIG. 9, when the gate signal of the power transistor M1 is at a high level, the first signal has the same waveform as that of the voltage VR1 across the sampling resistor R1. During a period starting from the falling edge of the gate signal of the power transistor M1, the positive voltage waveform of the second signal is partially identical with that of the voltage V3 at the anti-phase terminal of the auxiliary winding.

In the embodiments as shown in FIG. 3 and FIG. 4, the overvoltage detection module 10 compares the first signal output from the timing selection module 15 to a predetermined first reference voltage VREF1 and output the comparison result to the switch control module 13. If the first signal exceeds the predetermined first reference voltage VREF1, it indicates that overvoltage occurs in the output voltage. The switch control module 13 outputs at a terminal GATE a cut-off signal for the output power transistor M1 according to the comparison result to cut off the power transistor M1. In another aspect, the current limiting module 11 compares the second signal output from the timing selection module to a predetermined second reference voltage VREF2 and output the comparison result to the switch control module 13. If the second signal exceeds the predetermined second reference voltage VREF2, it indicates that overcurrent occurs in the primary winding current. The switch control module 13 outputs at a terminal GATE a cut-off signal for the output power transistor according to the comparison result to cut off the power transistor M1.

The PWM comparator 12 compares the second signal output from the timing selection module 15 to an error signal for the output voltage received from the terminal FB of the AC-DC converter circuit and output the comparison result to a switch control module 13. If the second signal exceeds the error signal for the output voltage, the switch control module 13 outputs a cut-off signal for the output power transistor M1 according to the comparison result to cut off the power transistor M1.

The working principle of the converter circuits shown in FIG. 3 and FIG. 4 is described as follows.

The rectification filter circuit comprised of the auxiliary winding N3, the diode D5 coupled to the anti-phase terminal of the auxiliary winding N3 and the capacitor C2 provides the VDD voltage for the offline AC-DC controller circuit. The relation between the anti-phase voltage V3 of the auxiliary winding N3 and the anti-phase voltage V2 of the secondary winding N2 states that:

$$\frac{V3}{V2} = \frac{n3}{n2} \quad (1)$$

where n3 denotes the number of turns of the auxiliary winding N3 and n2 denotes the number of turns of the secondary winding N2.

When the power transistor M1 is in cut-off state and the current through the secondary and the auxiliary windings continues to flow, the relation between the voltage V3 and the output voltage Vo is expressed as follows:

$$V3 = \frac{n3}{n2}(Vo + V_{FD5}) \quad (2)$$

where $V_{FD5}$ is a forward voltage drop across the diode D5.

The relation between the voltage Vcs at the time-multiplexed terminal CS and the output voltage Vo is expressed as follows:

$$Vcs = (V3 - V_{FD7}) \cdot \quad (4)$$
$$\frac{R4 + R1}{R5 + R4 + R1} = \left[\frac{n3}{n2}(Vo + V_{FD5}) - V_{FD7}\right] \cdot \frac{R4 + R1}{R5 + R4 + R1}$$

where $V_{FD7}$ is a forward voltage drop across the diode D7.

Since the resistor R1 is the sampling resistor for the primary winding current, the resistance of the resistor R1 is very small compared with the resistor R4 and the resistor R5. Thus, the above equation can be simplified as:

$$Vcs = \left[\frac{n3}{n2}Vo + \frac{V_{FD5} - n2 \cdot V_{FD7}}{n2}\right] \cdot \frac{R4}{R5 + R4} \quad (5)$$

Accordingly, Vcs is in linear relation with the output voltage Vo. At this point, the timing selection module 15 reverts the signal at the multiplexed terminal CS into the sampled output voltage signal and outputs to the overvoltage detection module 10. The overvoltage detection for the output voltage can be realized by comparing the Vcs voltage with the internal reference voltage VREF1.

When the power transistor M1 conducts, there is current following through the primary winding. A voltage VR1 is generated when the primary winding current flows through the resistor R1. The anti-phase voltage of the secondary winding is a negative voltage. The diode D7 is reversely cut off. There is no current input to the time-multiplexed terminal CS. Thus, the Vcs voltage equals VR1. At this point, the timing control module 15 reverts the signal at the multiplexed terminal CS into the sampled current signal of the primary winding which is then fed to the current limiting module 11 and the PWM comparator 12, such that sampling current for the primary winding is realized.

Figure 5:
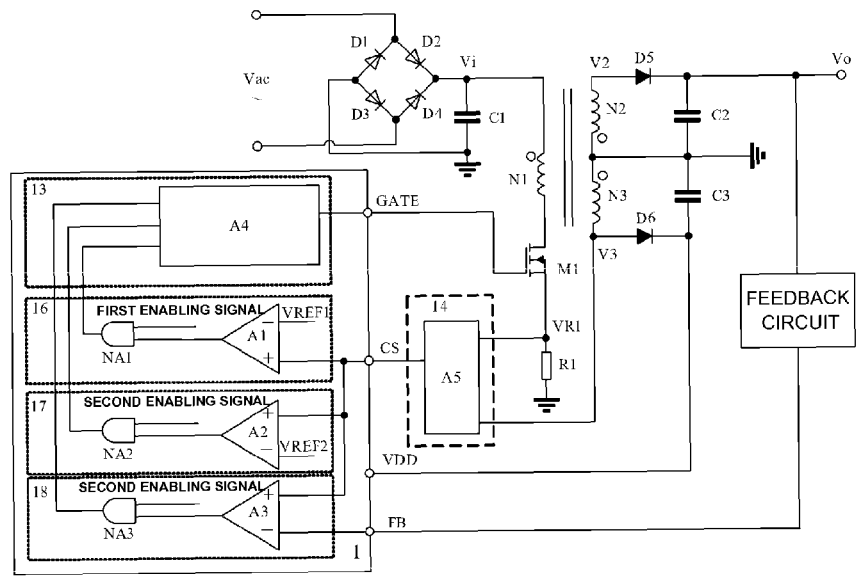
FIG. 5 illustrates a schematic of an offline AC-DC converter circuit according to yet another embodiment of the present invention.
Figure 6:
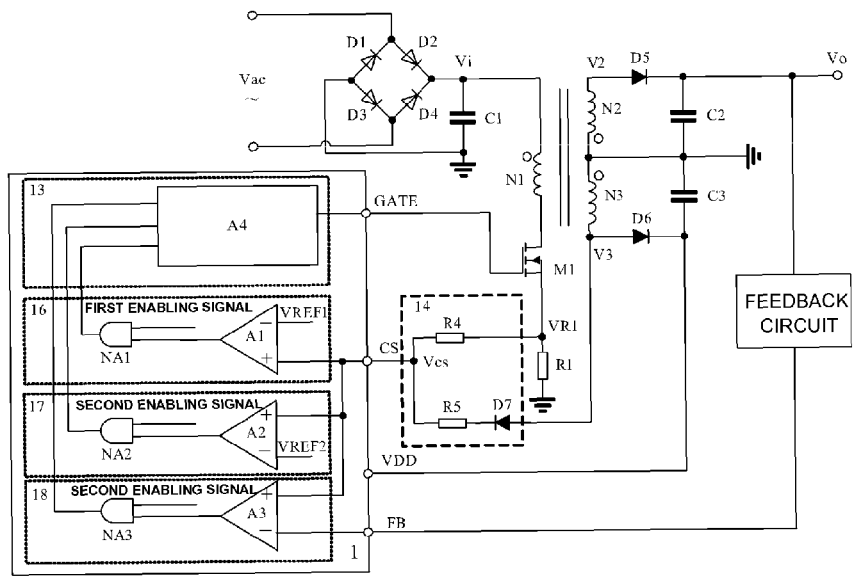
FIG. 6 illustrates a schematic of an offline AC-DC converter circuit according to yet another embodiment of the present invention.

FIG. 5 illustrates a schematic of an offline AC-DC converter circuit according to yet another embodiment of the present invention. FIG. 6 illustrates a schematic of an offline AC-DC converter circuit according to yet another embodiment of the present invention.

Compared with the offline AC-DC converter circuit shown in FIG. 3 and FIG. 4, the difference lies in that the overvoltage detection module 16, the current limiting module 17 and the PWM module 18 include conduct control circuits NA1, NA2, NA3, respectively, wherein the conduct control circuit N1 is coupled between the comparator A1 and the switch control module 13, the conduct control circuit N2 is coupled between the comparator A2 and the switch control module 13, and the conduct control circuit N3 is coupled between the comparator A3 and the switch control module 13. When the power transistor M1 conducts, the conduct control circuits NA2, NA3 allows the output from the current limiting module 17 and the PWM module 18 to be provided to the switch control module 13. When the power transistor M1 is cut off, the conduct control circuit NA1 allows the output from the overvoltage detection module 16 to be provided to the switch control module 13.

The overvoltage detection module 16 compares the voltage at the time-multiplexed terminal CS with the predetermined first reference voltage VREF 1. When the voltage at the time-multiplexed terminal CS exceeds the predetermined first reference voltage VREF1 and a first enabling signal is effective, the comparison result indicating the occurrence of overvoltage in the output voltage of the offline AC-DC converter circuit is fed to the switch control module 13. The switch control module 13 generates at the terminal GATE a cut-off signal for the power transistor M1 in order to cut off the power transistor M1.

The current limiting module 17 compares the voltage at the time-multiplexed terminal CS with the predetermined second reference voltage VREF 2. When the voltage at the time-multiplexed terminal CS exceeds the predetermined second reference voltage VREF2 and a second enabling signal is effective, the comparison result indicating the occurrence of overcurrent in the primary winding current of the offline AC-DC converter circuit is fed to the switch control module 13. The switch control module 13 generates at the terminal GATE a cut-off signal for the power transistor M1 in order to cut off the power transistor M1.

The PWM comparator A3 compares the voltage at the time-multiplexed terminal CS with an error signal for the output voltage of the offline AC-DC converter circuit. When the voltage at the time-multiplexed terminal CS exceeds the error signal for the output voltage of the offline AC-DC converter circuit and a second enabling signal is effective, the PWM module 18 outputs a trigger signal to the switch control module 13. The switch control module 13 thus generates at the terminal GATE a cut-off signal for the power transistor M1 in order to cut off the power transistor M1.

In the embodiments shown in FIG. 5 and FIG. 6, the waveform of the first enabling signal is the same as that of the gate control signal for the power transistor M1. The second enabling signal is a high voltage narrow pulse which is generated at the falling edge of the gate control signal for the power transistor M1.

During the period when the power transistor M1 is cut off, Vcs is in linear relation with the output voltage Vo, as discussed above. At this moment, when the first signal exceeds the predetermined first reference voltage, it indicates that an overvoltage occurs in the output voltage. Overvoltage detection for the output voltage is thus realized. During the period when the power transistor M1 conducts, the Vcs voltage equals VR1.

Figure 10:
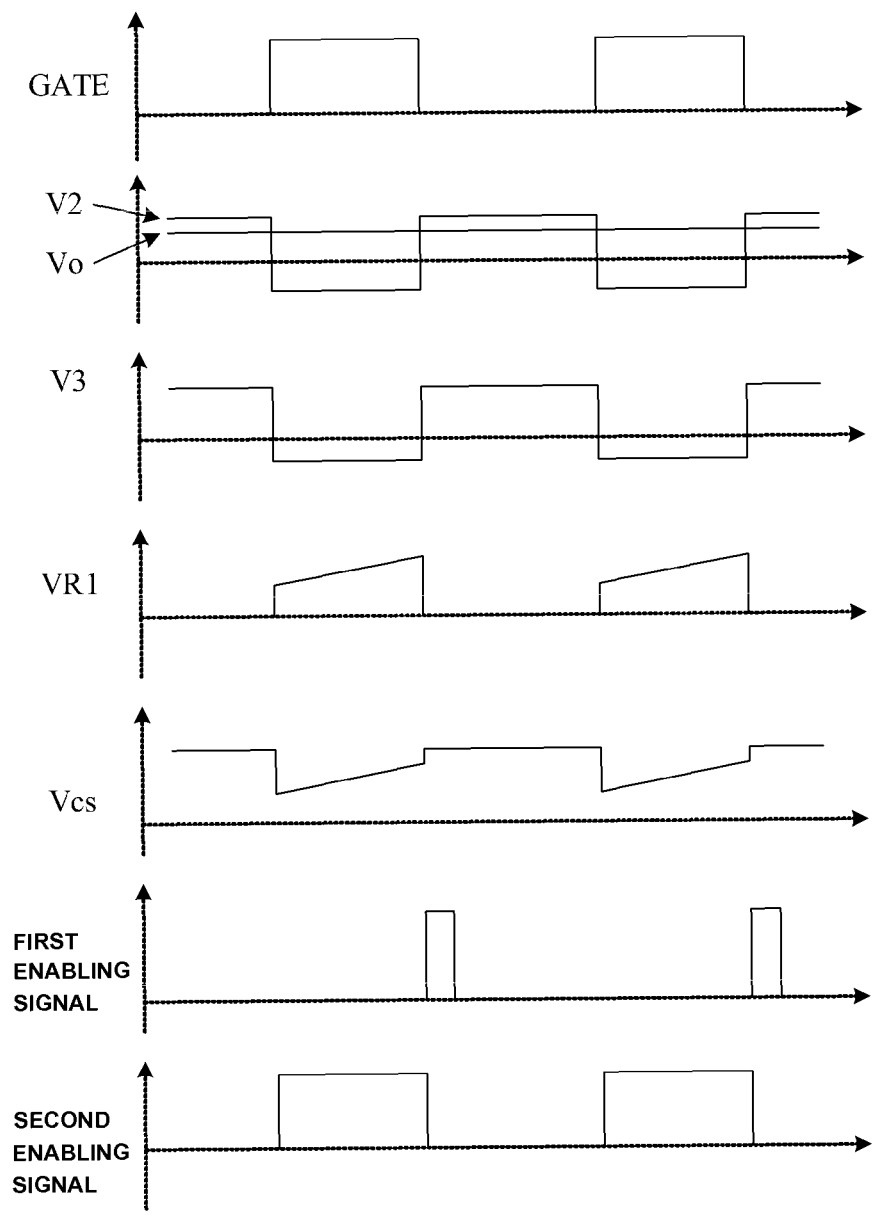
FIG. 10 illustrates waveforms of associated signals in the offline AC-DC converter circuit shown in FIG. 5 and FIG. 6 in continuous conduct mode.
Figure 11:
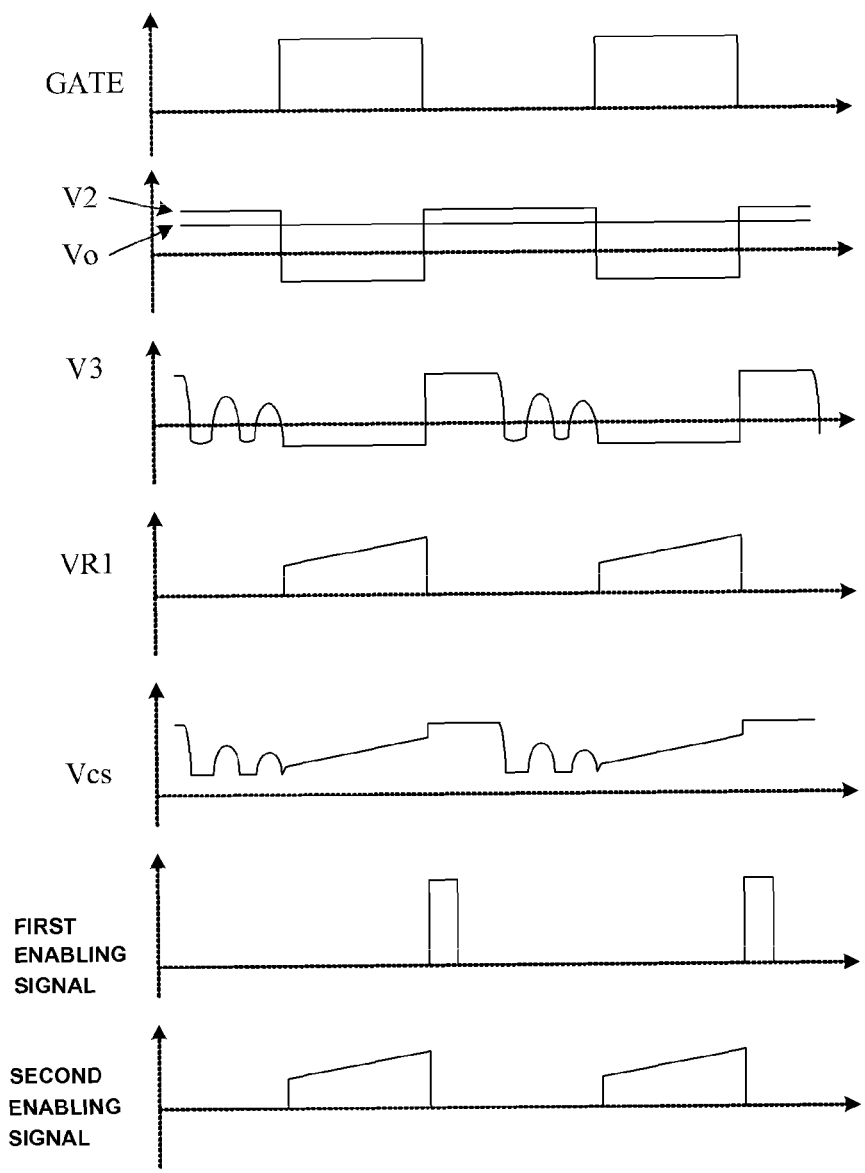
FIG. 11 illustrates waveforms of associated signals in the offline AC-DC converter circuit shown in FIG. 5 and FIG. 6 in discontinuous conduct mode.

The waveforms of the associated signals in the offline AC-DC converter circuit as shown in FIG. 5 and FIG. 6 is illustrated in FIG. 10 and FIG. 11, where FIG. 10 illustrates waveforms of the associated signals in the continuous conduct mode and FIG. 11 illustrates waveforms of the associated signals in the discontinuous conduct mode.

Figure 12:
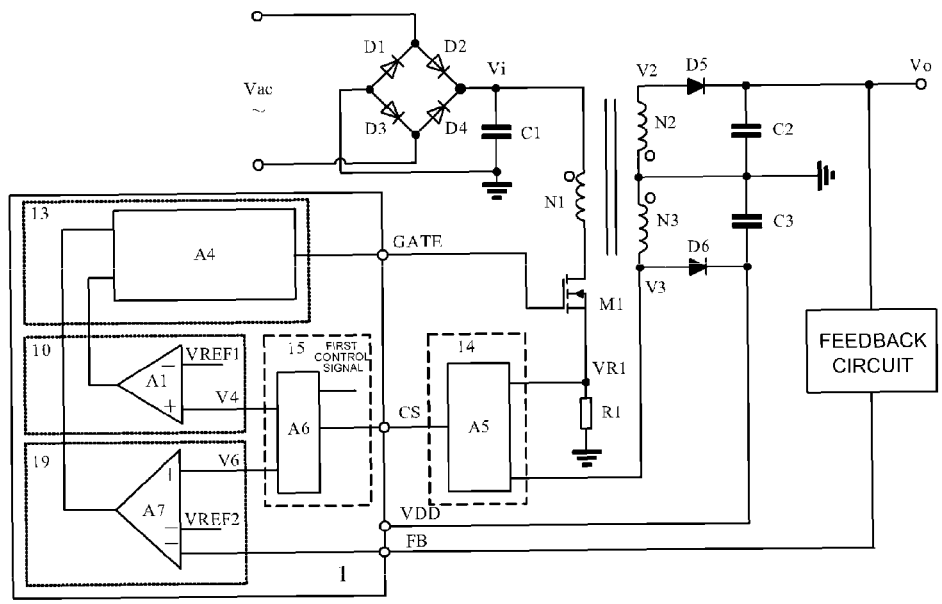
FIG. 12 illustrates a schematic of an offline AC-DC converter circuit according to yet another embodiment of the present invention.
Figure 13:
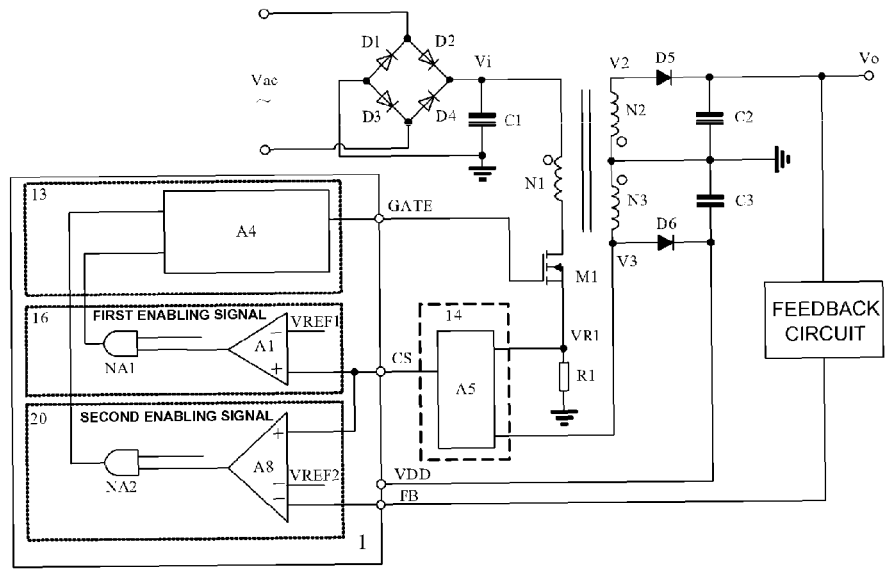
FIG. 13 illustrates a schematic of an offline AC-DC converter circuit according to yet another embodiment of the present invention.

FIG. 12 illustrates a schematic of an offline AC-DC converter circuit according to yet another embodiment of the present invention. FIG. 13 illustrates a schematic of an offline AC-DC converter circuit according to yet another embodiment of the present invention.

Compared with the embodiments shown in FIG. 3 and FIG. 5, the difference lies in that the current limiting module 17 and the PWM module 18 are integrated into a current limiting and PWM module 19 or 20. That is, the comparator A7 or A8 having three input terminals is used to replace the comparator A2 and A3 as discussed in the previous embodiments.

In the embodiment shown in FIG. 12, the output signal of the timing selection module 15 is selectively output to the comparator A1 in the overvoltage detection module 10 and the comparator A7 in the current limiting and PWM module 19. The second reference voltage VREF2 and the error signal for the output voltage of the offline AC-DC converter circuit are fed to the comparator A7. The overvoltage detection module 10 compares the first signal output from the timing selection module 15 to a predetermined first reference voltage VREF1 and output the comparison result to the switch control module 13. If the first signal exceeds the predetermined first reference voltage VREF1, it indicates that overvoltage occurs in the output voltage. The switch control module 13 generates at a terminal GATE a cut-off signal for the power transistor M1 according to the comparison result to cut off the power transistor M1. In another aspect, the current limiting and PWM module 19 compares the second signal output from the timing selection module to a predetermined second reference voltage VREF2 and the error signal for the output voltage of the AC-DC converter circuit and output the comparison result to the switch control module 13. If the second signal exceeds the predetermined second reference voltage VREF2 or the second signal exceeds the error signal for the output voltage, the switch control module 13 generates at a terminal GATE a cut-off signal for the power transistor according to the comparison result to cut off the power transistor M1.

In the embodiment shown in FIG. 13, the overvoltage detection module 16 and the current limiting and PWM module 20 include conduct control circuits NA1 and NA2, respectively, wherein the conduct control circuit N1 is coupled between the comparator A1 and the switch control module 13 and the conduct control circuit N2 is coupled between the comparator A8 and the switch control mode 13. When the power transistor M1 conducts, the conduct control circuit NA2 allows the output from the current limiting and PWM module 20 to be provided to the switch control module 13. When the power transistor M1 cuts off, the conduct control circuit NA1 allows the output from the overvoltage detection module 16 to be provided to the switch control module 13.

The overvoltage detection module 16 compares the voltage at the time-multiplexed terminal CS with the predetermined first reference voltage VREF 1. When the voltage at the time-multiplexed terminal CS exceeds the predetermined first reference voltage VREF1 and a first enabling signal is effective, the comparison result indicating the occurrence of overvoltage in the output voltage of the offline AC-DC converter circuit is fed to the switch control module 13. The switch control module 13 generates at the terminal GATE a cut-off signal for the power transistor M1 in order to cut off the power transistor M1.

The current limiting and PWM module 20 compares the voltage at the time-multiplexed terminal CS to a predetermined second reference voltage VREF2 and the error signal for the output voltage of the AC-DC converter circuit. When the voltage at the time-multiplexed terminal CS exceeds the predetermined second reference voltage VREF2 or exceeds the error signal for the output voltage and a second enabling signal is effective, the comparison output is sent to the switch control module 13. The switch control module 13 thus generates at the terminal GATE a cut-off signal for the power transistor M1 in order to cut off the power transistor M1.

It is appreciated that the foregoing embodiments are only illustrative. The present invention is not intended to be limiting in these respects. Any modification conceived without departing from the scope of the present invention, including, but not limited to apply the idea of the overvoltage detection using a time-multiplexed terminal CS to other switch-mode power supply related area, a modification to timing selection module, a modification to the external sampling module, a change to parts of the circuit, a replacement of the type or model of any component as well as other non-substantial replacement or variation, shall be construed as falling within the scope of the present invention.

What is claimed is:

1. An offline AC-DC controller circuit, generating a corresponding control signal based on an input sampled current signal and an input sampled voltage signal, wherein the sampled current signal and the sampled voltage signal are provided at a single input terminal (CS) by way of time division multiplexing, the offline AC-DC controller circuit comprises:
   a time division processing module coupled to the single input terminal (CS), and
   a switch control module (13) coupled to the time division processing module,
   wherein the time division processing module processes the sampled current signal and the sampled voltage signal provided at the single input terminal (CS), and the time division processing module alternately outputs processing results of the sampled current signal and processing results of the sampled voltage signal to the switch control module (13).

2. The controller circuit of claim 1, wherein the time division processing module comprises:
an overvoltage detection module (10),
a current limiting module (11),
a pulse width modulation module (12), and
a timing selection module (15),
wherein the timing selection module comprises:
an input terminal coupled to the single input terminal (CS), and
at least two output terminals, and
the timing selection module (15) alternatively enables one of the output terminals to connect to the current limiting module (11) and the pulse width modulation module (12) and the other output terminal to connect to the overvoltage detection module (10) such that the timing selection module alternatively provides the sampled current signal through the single input terminal (CS) to the current limiting module (11) and the pulse width modulation module (12) and the sampled voltage signal through the single input terminal (CS) to the overvoltage detection module (10).

3. The controller circuit of claim 2, wherein the overvoltage detection module (10) is configured to compare the sampled voltage signal to a predetermined first reference voltage (VREF1) and to send the comparison result to the switch control module (13),
wherein if the sampled voltage signal exceeds the first reference voltage (VREF1), the switch control module (13) outputs a cut-off signal for cutting off a power transistor (M1); the current limiting module (11) is configured to compare the sampled current signal to a predetermined second reference voltage (VREF2) and to send the comparison result to the switch control module (13),
wherein if the sampled current signal exceeds the second reference voltage (VREF2), the switch control module (13) outputs a cut-off signal for cutting off the power transistor (M1); the pulse width modulation module (12) is configured to compare the sampled current signal to a signal which is input externally to the offline AC-DC controller circuit and to send the comparison result to the switch control module (13), and
wherein if the sampled current signal exceeds the externally input signal, the switch control module (13) outputs a cut-off signal for cutting off the power transistor (M1).

4. The controller circuit of claim 1, wherein the time division processing module comprises:
an overvoltage detection module (16),
a current limiting module (17), and
a pulse width modulation module (18),
wherein the overvoltage detection module (16) receives the sampled voltage signal through the single input terminal (CS); the current limiting module (17) and the pulse width modulation module (18) receive the sampled current signal through the single input terminal (CS); the overvoltage detection module (16), the current limiting module (17) and the pulse width modulation (18) comprise conduct control circuits (NA1, NA2, NA3) coupled to the switch control module (13),
wherein the conduct control circuits (NA1, NA2, NA3) alternatively enable an output signal of the overvoltage detection module (18) and an output signal of the current limiting module (16) and the pulse width modulation module (17) to be provided to the switch control module (13).

5. The control circuit of claim 4, wherein the output signal of the overvoltage detection module (18) is provided to the switch control module (13) by applying a first enabling signal to an enable input terminal of the conduct control circuit (NA1) in the overvoltage detection module (16), and
the output signal of the current limiting module (17) and the pulse width modulation module (18) is provided to the switch control module (13) by applying a second enabling signal to an enable input terminal of the conduct control circuit (NA2, NA3) in the current limiting module (17) and the pulse width modulation module (18),
wherein the first enabling signal and the second enabling signal are mutually exclusive.

6. The controller circuit of claim 4, wherein the overvoltage detection module (16) is configured to compare the sampled voltage signal to a predetermined first reference voltage (VREF1) and to send the comparison result to the switch control module (13) when the first enabling signal is applied to the enable input terminal of the conduct control circuit (NA1),
wherein if the sampled voltage signal exceeds the first reference voltage (VREF1), the switch control module (13) outputs a cut-off signal for cutting off a power transistor (M1); the current limiting module (17) is configured to compare the sampled current signal to a predetermined second reference voltage (VREF2) and to send the comparison result to the switch control module (13) when the second enabling signal is applied to the enable input terminal of the conduct control circuit (NA2),
wherein if the sampled current signal exceeds the second reference voltage (VREF2), the switch control module (13) outputs a cut-off signal for cutting off the power transistor (M1); the pulse width modulation module (18) is configured to compare the sampled current signal to a signal which is input externally to the offline AC-DC controller circuit and to send the comparison result to the switch control module (13) when the second enabling signal is applied to the enable input terminal of the conduct control circuit (NA3), and
wherein if the sampled current signal exceeds the externally input signal, the switch control module (13) outputs a cut-off signal for cutting off the power transistor (M1).

7. An offline AC-DC converter circuit, comprising:
a rectifier bridge stack (D1, D2, D3, D4);
a primary winding (N1) coupled to the rectifier bridge stack (D1, D2, D3, D4);
a power transistor (M1) coupled to the primary winding (N1);
a secondary winding (N2);
an auxiliary winding (N3);
an external sampling module (14); and
an offline AC-DC controller circuit (1),
wherein the offline AC-DC controller circuit is configured to generate a corresponding control signal based on an input sampled current signal and an input sampled voltage signal, wherein the sampled current signal and the sampled voltage signal are provided by the external sampling module (14) at a single input terminal (CS) by way of time division multiplexing, the offline AC-DC controller circuit comprises:
a time division processing module coupled to the single input terminal (CS) and
a switch control module (13) coupled to the time division processing module,
wherein the time division processing module processes the sampled current signal and the sampled voltage signal provided at the single input terminal (CS), and
the time division processing module alternately outputs processing results of the sampled current signal and processing results of the sampled voltage signal to the switch control module (13).

8. The converter circuit of claim 7, wherein, during the period when the power transistor (M1) conducts, the sampled current signal is provided at the single input terminal (CS), while during the period when the power transistor (M1) is cut off and the current through the secondary winding and the auxiliary winding continue to flow, the sampled voltage signal is provided at the single input terminal (CS).

9. The converter circuit of claim 8, wherein the external sampling module (14) is configured to obtain the sampled current signal by detecting, when the power transistor (M1) conducts, a voltage drop across a sampling resistor (R1) coupled in series with the primary winding (N1) whose current flows through the sampling resistor (R1); moreover, the external sampling module (14) is configured to obtain the sampled voltage signal by detecting, when the power transistor (M1) is cut off, a voltage at an anti-phase terminal of the auxiliary winding (N3).

10. The converter circuit of claim 7, wherein the time division processing module comprises:
an overvoltage detection module (10),
a current limiting module (11),
a pulse width modulation module (12), and
a timing selection module (15),
wherein the timing selection module comprises:
an input terminal coupled to the single input terminal (CS) and
at least two output terminals, and
the timing selection module (15) alternatively enables one of the output terminals to connect to the current limiting module (11) and the pulse width modulation module (12) and enables the other output terminal to connect to the overvoltage detection module (10) such that the timing selection module alternatively provides the sampled current signal through the single input terminal (CS) to the current limiting module (11) and the pulse width modulation module (12) and the sampled voltage signal through the single input terminal (CS) to the overvoltage detection module (10),
wherein a gate voltage of the power transistor (M1) is controlled by the switch control module (13).

11. The converter circuit of claim 10, wherein the timing selection module (15) further comprises:
a control signal input terminal for providing a first control signal to output the sampled voltage signal and the sampled current signal alternatively,
wherein the frequency of the first control signal is in phase with that of the gate signal of the power transistor (M1).

12. The converter circuit of claim 10, wherein the overvoltage detection module (10) is configured to compare the sampled voltage signal to a predetermined first reference voltage (VREF1) and to send the comparison result to the switch control module (13),
wherein if the sampled voltage signal exceeds the first reference voltage (VREF1), the switch control module (13) outputs a cut-off signal for cutting off a power transistor (M1); the current limiting module (11) is configured to compare the sampled current signal to a predetermined second reference voltage (VREF2) and to send the comparison result to the switch control module (13),
wherein if the sampled current signal exceeds the second reference voltage (VREF2), the switch control module (13) outputs a cut-off signal for cutting off the power transistor (M1); the pulse width modulation module (12) is configured to compare the sampled current signal to a signal which is input externally to the offline AC-DC controller circuit and to send the comparison result to the switch control module (13), and
wherein if the sampled current signal exceeds the externally input signal, the switch control module (13) outputs a cut-off signal for cutting off the power transistor (M1).

13. The converter circuit of claim 7, wherein the time division processing module comprises:
an overvoltage detection module (10),
a current limiting module (17), and
a pulse width modulation module (18),
wherein the overvoltage detection module (16) receives the sampled voltage signal through the single input terminal (CS); the current limiting module (17) and the pulse width modulation module (18) receive the sampled current signal through the single input terminal (CS), the gate voltage of the power transistor (M1) is controlled by the switch control module (13); the overvoltage detection module (16), the current limiting module (11) and the pulse width modulation (12) comprise conduct control circuits (NA1, NA2, NA3) coupled to the switch control module (13), and
wherein the conduct control circuits (NA1, NA2, NA3) alternatively enable an output signal of the overvoltage detection module (18) and an output signal of the current limiting module (16) and the pulse width modulation module (17) to be provided to the switch control module (13).

14. The converter circuit of claim 13, wherein the output signal of the overvoltage detection module (18) is provided to the switch control module (13) by applying a first enabling signal to an enable input terminal of the conduct control circuit (NA1) in the overvoltage detection module (16); and the output signal of the current limiting module (17) and the pulse width modulation module (18) is provided to the switch control module (13) by applying a second enabling signal to an enable input terminal of the conduct control circuits (NA2, NA3) in the current limiting module (17) and the pulse width modulation module (18),
wherein the first enabling signal and the second enabling signal are mutually exclusive.

15. The converter circuit of claim 13, wherein the overvoltage detection module (16) is configured to compare the sampled voltage signal to a predetermined first reference voltage (VREF1) and to send the comparison result to the switch control module (13) when the first enabling signal is applied to the enable input terminal of the conduct control circuit (NA1),
wherein if the sampled voltage signal exceeds the first reference voltage (VREF1), the switch control module (13) outputs a cut-off signal for cutting off a power transistor (M1); the current limiting module (17) is configured to compare the sampled current signal to a predetermined second reference voltage (VREF2) and to send the comparison result to the switch control module

(13) when the second enabling signal is applied to the enable input terminal of the conduct control circuit (NA2), wherein if the sampled current signal exceeds the second reference voltage (VREF2), the switch control module (13) outputs a cut-off signal for cutting off the power transistor (M1); the pulse width modulation module (18) is configured to compare the sampled current signal to a signal which is input externally to the offline AC-DC controller circuit and to send the comparison result to the switch control module (13) when the second enabling signal is applied to the enable input terminal of the conduct control circuit (NA3), and wherein if the sampled current signal exceeds the externally input signal, the switch control module (13) outputs a cut-off signal for cutting off the power transistor (M1).

\* \* \* \* \*